United States Patent [19]

Bargain

[11] 3,725,345
[45] Apr. 3, 1973

[54] COMPOSITION COMPRISING AN EPOXY RESIN ACID ANHYDRIDE AND A N,N' BIS-IMIDE

[75] Inventor: Michel Bargain, Lyon, France
[73] Assignee: Rhone-Roulenc S.A., Paris, France
[22] Filed: Jan. 14, 1971
[21] Appl. No.: 106,570

[30] Foreign Application Priority Data

Jan. 15, 1970 France..................................7001414

[52] U.S. Cl. .........260/47 EC, 106/39 R, 117/124 E, 117/127, 117/138.8 R, 117/161 ZB, 161/184, 260/2 EC, 260/59, 260/78 UA, 260/78.4 EP
[51] Int. Cl. ..............................................C08g 30/14
[58] Field of Search.......260/47 EC, 47 EN, 78.4 EP, 260/2 EC, 59, 326 R, 78 UA

[56] References Cited
UNITED STATES PATENTS 3,379,685 4/1968 Preininger et al. ................260/47 EN
3,450,711 6/1969 Megna et al. ........................260/2 EP Primary Examiner—William H. Short
Assistant Examiner—T. Pertilla
Attorney—Cushman, Darby & Cushman

[57] ABSTRACT

A thermosetting composition which may be cured to give resins having good heat stability and rigidity comprising the reaction product of an epoxy resin, a carboxylic acid anhydride and a N,N'-bis-imide of the formula:

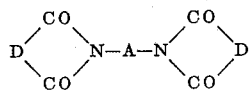

in which D represents a divalent radical containing a carbon-carbon double bond, and A represents a divalent radical containing at least two carbon atoms.

14 Claims, No Drawings

COMPOSITION COMPRISING AN EPOXY RESIN ACID ANHYDRIDE AND A N,N' BIS-IMIDE

This invention relates to thermosetting compositions based on epoxy resins.

Compositions have already been marketed for many years as "epoxy resins," which, depending on the proportions and the exact nature of the starting materials, can be in the form of viscous liquids or low melting solids. Some typical examples of such compositions are the products of condensation, in an alkaline medium, of epichlorhydrin with organic compounds possessing alcoholic or phenolic hydroxyl groups.

These compositions are capable of being irreversibly cured under the influence of heat and in the presence of amino or acidic reagents, to give three-dimensional materials which possess remarkable properties of adhesion, hardness and resistance to chemical agents. These materials, in the form of composite articles, have found extensive outlets in the aeronautical industry.

It is known (see, for example U.S. Pat. No. 2,324,483) that epoxy resins can be cured by dicarboxylic acid anhydrides; phthalic anhydride has been widely recommended for this purpose. It was later proposed to improve the properties of the cured resins, in particular their non-inflammability and electrical properties by the use of polyhalogenated anhydrides (see Robitschek and Nelson — Ind. Eng. Chem. 48 1951 (1956) and to improve the storage stability of mixtures containing the curing agent by using anhydrides which are liquid at ambient temperature or possess a fairly low melting point (see Weiss — Ind. Chem. Eng. 49 1089 (1957)). The anhydrides which are liquid at a fairly low temperature lend themselves well to moulding by casting mixtures containing them, but the resins cured by this process become deformed, especially under the combined action of mechanical and thermal stresses.

It has also been suggested to carry out the curing of various types of epoxy resins with dianhydrides of tetracarboxylic acids, such as pyromellitic acid, dimethylhexahydronaphthyltetracarboxylic acid, cyclopentanetetracarboxylic acid, benzophenonetetracarboxylic acids, diphenylmethanetetracarboxylic acids, and azophthalic acid, as well as with condensates obtained from a difunctional agent and a tricarboxylic acid anhydride, or from addition compounds of dialkylbenzenes and maleic anhydride. Diels-alder addition products of maleic anhydride and a polycyclopentadienyl derivative have also been recommended for this purpose. These various dianhydrides confer on the cured resins one or more advantages, such as raising the heat distortion temperature, improving the resistance to certain solvents or chemical agents, or increasing the stability towards severe thermal stresses. However, their distribution within the resin is heterogeneous on account of their high melting points and their high reactivity, with the result that the cured resins have relatively weak mechanical properties.

The object of the present invention is to provide thermosetting compositions based on epoxy resins, which give rise to cured resins having good heat stability, and excellent rigidity, both at ambient temperature and at temperatures in the region of 250°C.

According to the present invention, there is provided a thermosetting composition which comprises the reaction product of an epoxy resin, a polycarboxylic acid anhydride and a N,N'-bis-imide of general formula:

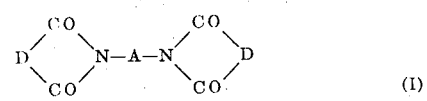

in which D represents a divalent radical containing a carbon-carbon double bond, and A is a divalent radical possessing at least two carbon atoms.

All the usual epoxy resins can be used in the preparation of the compositions of the invention. Thus glycidyl ethers obtained by reacting, in known manner, polyols such as glycerol, trimethylolpropane, but anediol and pentaerythritol, with epichlorhydrin may be used as well as the glycidyl ethers of phenols such as 2,2-bis(4-hyohoxyphenyl)-propane, bis(hydroxyphenyl)-methane, resorcinol, hydroquinone, pyrocatechol, phloroglucinol, 4,4'-dihydroxydiphenyl, and the condensation products of the phenol/aldehyde type. The reaction products of epichlorhydrin with primary or secondary amines such as bis(4-methylaminophenyl)-methane and bis(4-aminophenyl)-sulphone, as well as aliphatic or alicyclic polyepoxides obtained by epoxidation, with peracids, of the corresponding unsaturated derivatives may also be used.

These various types of epoxy resins are fully described in the literature so that further discussion is unnecessary. As regards their preparation, reference may be made to, for example, the work of Houben-Weil, volume 14/2, page 462.

The epoxy resins in which each molecule has at least two, and preferably more than three, epoxy groups are of very particular interest; amongst these, resins which are essentially aromatic, such as glycidyl ethers of poly(hydroxyphenyl)alkanes or phenol-formaldehyde resins, are preferred.

The polycarboxylic acid anhydrides used in the preparation of the compositions of this invention are, generally, the anhydrides known to be curing agents for epoxy resins, some typical examples of which are mentioned in "Epoxy Resin Technology," Paul F. Bruins (Interscience Publishers, 1968). The choice of anhydride is generally dependent on the type of application for which the composition is intended. Thus, in order to obtain moulded objects by casting, anhydrides which have a low melting point and are relatively unreactive are preferred, such as phthalic anhydride, maleic anhydride, tetrahydrophthalic anhydride, hexahydrophthalic anhydride, endomethylenetetrahydrophthalic anhydride, itaconic anhydride, citraconic anhydride and dodecylsuccinic anhydride. If the composition is intended for the preparation of laminates or compression-moulded articles, anhydrides of tricarboxylic or tetra-carboxylic aromatic acids, such as trimellitic anhydride, pyromellitic anhydride, azophthalic anhydride, benzophenonetetracarboxylic acid anhydride, cyclopentanetetracarboxylic acid anhydride, 3,4,4'-benzophenonetricarboxylic acid anhydride and benzoylpyromellitic anhydride are preferably employed.

The proportion of anhydride relative to the epoxy resin can vary within fairly wide limits; it is usually chosen so that the ratio (Number of anhydride groups)/(Number of epoxy groups)

is between 0.4 and 1.5, and preferably between 0.8 and 1.1.

The bis-imides of formula (I) are preferably ones in which A represents a linear or branched alkylene radical having less than 13 carbon atoms, a cycloalkylene radical having five or six carbon atoms in the ring, a divalent heterocyclic radical containing at least one O, N or S atom, or a benzene or polycyclic aromatic radical, these various radicals optionally containing substituents which do not give rise to a side reaction with the reactive groups present, either during the preparation of the composition or during the curing of the latter. The bis-imides which it is preferred to use are those of formula (I), in which the symbol A represents a divalent radical comprising several benzene or alicyclic radicals which are joined directly, or indirectly by a divalent atom or group, such as by an oxygen or sulphur atom, an alkylene group having from one to three carbon atoms, or a $—NR_2—$, $—P(O)R_1—$, $$—N=N—,$$
$$\downarrow$$
$$O$$

$—CONH—$, $—SO_2—$,

$—CO—O—$, $—N=N—$,

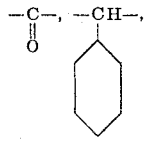

$—S—S—$, $—SiR_1R_2—$, $—NY—CO—X—CO—NY—$,
$—O—CO—X—CO—O—$,

group in which $R_1$, $R_2$ and Y represent alkyl radicals having from one to four carbon atoms or cycloalkyl radicals having five or six carbon atoms in the ring, or benzene or polycyclic aromatic radicals, and X represents a linear or branched alkylene radical having less than 13 carbon atoms, a cycloalkylene radical having five or six carbon atoms in the ring, or a monocyclic or polycyclic arylene radical.

The divalent radical represented by D can be a hydrocarbon radical possessing a polymerizable carbon-carbon double bond, optionally possessing substituents which do not give rise to a side reaction with the reactive groups present. This radical can be considered to be derived from an ethylenic anhydride of formula

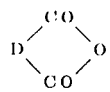

such as maleic anhydride, citraconic anhydride, tetrahydrophthalic anhydride or itaconic anhydride, as well as the Diels-Alder reaction products of cyclodiene with one of these anhydrides.

Examples of N,N'-bis-imides of formula (I) which can be used include: N,N'-ethylene-bis-maleimide, N,N'-hexamethylene-bis-maleimide, N,N'-meta-phenylene-bis-maleimide, N,N'-para-phenylene-bis-maleimide, N,N'-4,4'-diphenylmethane-bis-maleimide, N,N'-4,4'-diphenyl ether-bis- maleimide, N,N'-4,4'-diphenylsulphone-bis-maleimide, N,N'-4,4'-dicyclohexylmethane-bis-maleimide, N,N'-α, α'-4,4'-dimethylenecyclohexane-bis-maleimide, N,N'-meta-xylylene-bis-maleimide and N,N'-4,4'-diphenylcyclohexane-bis-maleimide.

The proportions, by weight, of bis-imide are generally between 40 percent and 250 percent based on the weight of epoxy resin employed; the preferred proportions are, however, between 120 percent and 200 percent (same basis).

The preparation of the compositions of this invention can be carried out by heating the mixture of the epoxy resin, anhydride and bis-imide, until a homogeneous liquid mixture is obtained. It is advantageous to carry out a homogenization beforehand if the anhydride used has a relatively high melting point (of the order of 200°C. or above). The temperature can vary within fairly wide limits, as a function of the nature of the epoxy resin and the anhydride present, but as a general rule it is between 50°C. and 200°C. A variant of this process involves liquefying the mixture of epoxy resin and bis-imide, by heating, and then introducing the anhydride into this liquid mixture.

The compositions according to the invention can be cured by heating at temperatures from 150° to 300°C., preferably between 175° and 280°C. A curing accelerator, such as tributylamine, benzyldimethylamine-tris(dimethylaminomethyl)phenol, α-methylbenzyl-dimethylamine, 1,4-diaza-2,2,2-bicyclo-octane, azobisisobutyronitrile or cumyl peroxide, can be incorporated into compositions which are prepared from an anhydride which is not very reactive; the proportion, by weight, of accelerator is usually from 0.1 to 2 percent, relative to the weight of epoxy resin.

The compositions of this invention can be used directly in the liquid state, their shaping requiring only a simple casting, and then subsequently cured under the conditions mentioned above. They can also be used, after having been cooled and ground, in the form of powders, which lend themselves remarkably well to compression moulding operations, if necessary in the presence of fillers in the form of powders, spheres, granules, fibers or flakes. The compositions can also be used in solution in a solvent such as acetophenone, acetone, dichlorethane, ethyl acetate, pyridine, dimethylformamide or N-methylpyrrolidone. Such solutions are very suitable for producing laminates, the skeleton of which can be based on mineral or synthetic fibers.

The compositions can, in addition, include for example, fireproofing substances, pigments, colorants, mould release agents and blowing agents, and are equally suitable for producing multicellular resins and for bonding and coating metals, ceramics and synthetic resins.

The following examples further illustrate the present invention; in these examples, the measurements of flexural breaking strength were carried out with a span of 25.4 mm.

EXAMPLE 1

15 g. of an epoxy resin which can be represented by the average formula

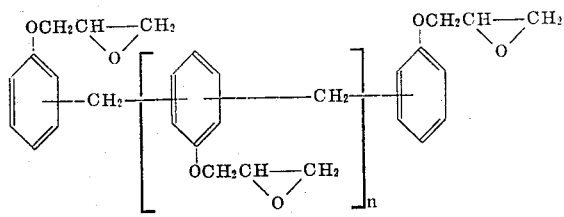

containing, on average, 0.556 epoxy group per 100 g. of product, marketed under the tradename "EPIKOTE 154," 12.75 g. of tetrahydrophthalic anhydride and 22.7 g. of N,N'-4,4'-diphenylmethane-bis-maleimide, were introduced into a vessel kept in a liquid heated to 150°C. When the mixture started to melt, it was stirred and kept under these conditions for 15 minutes.

The liquid mixture was then cast into a parallelepiped-shaped mould (125 mm. × 75 mm. × 6 mm.), the internal walls of which were coated with polytetrafluoroethylene, the mould being heated to 200°C. beforehand. The mixture was left for 30 hours at this temperature and then removed from the mould while hot. The moulded object was then subjected to a supplementary heat treatment at 250°C, for 24 hours. It then had a flexural breaking strength, at 25°C, of 11.3 kg/mm². At 250°C. this strength was 2.5 kg/mm².

EXAMPLE 2

The experiment described in Example 1 was repeated, but using: 15 g. of epoxy resin described in Example 1, 12.75 g. of tetrahydrophthalic anhydride, 22.7 g. of N,N'-4,4'-diphenyl ether-bis-maleimide, and 0.225 g. of tributylamine. Moulding was carried out at 200°C for 4 hours.

A moulded article was finally obtained having a flexural breaking strength of 3.7 kg/mm² at 250°C., and of 8.1 kg/mm² at 25°C. After heating for 560 hours at 250°C, this strength was still 8.9 kg/mm² (measured at 25°C.).

EXAMPLE 3

A liquid composition was prepared in the manner indicated in Example 1, but using: 15 g. of epoxy resin described in Example 1, 13.7 g. of endomethylenetetrahydrophthalic anhydride, 23.5 g. of N,N'-4,4'-diphenylmethane-bis-maleimide, and 0.225 g. of tributylamine.

The composition was then cast into the mould described in Example 1, which was previously heated to 175°C. Curing was effected at this temperature; it lasted for 4 hours.

After removal from the mould whilst hot, the article was subjected to a supplementary thermal treatment at 200°C., for 20 hours. It had a flexural breaking strength, at 250°C. of 4.4 kg/mm²; at 25°C., this strength was 9.1 kg/mm².

EXAMPLE 4

42.4 g. of an epoxy resin of average formula:

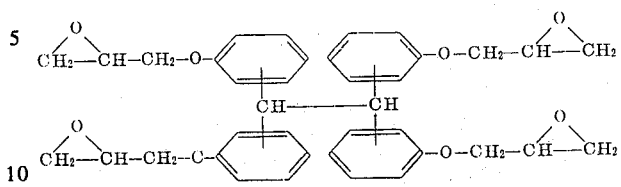

having an average molecular weight of 703 and containing 0.459 epoxide group per 100 g. of product, marketed under the tradename "Epon 1031," 17.7 g. of azophthalic anhydride and 49.2 g. of N,N'-4,4'-diphenylmethane-bis-maleimide, were intimately mixed. The mixture was then applied to a metal plate and kept for 21 minutes in a chamber heated to 150°C.

After cooling, the mess obtained was finely ground (diameter of the particles: 100 to 150μ). 25 g. of this powder were introduced into a cylindrical mould (diameter : 76 mm), which was placed between the platens of a press which had previously been heated to 280°C. The whole was kept at this temperature for 25 minutes under a pressure of 250 kg/cm².

After removal from the mould whilst hot, the article was subjected to a supplementary heat treatment at 250°C. for 48 hours. It had a flexural breaking strength, at 250°C., of 3.7 kg/mm²; at 25°C, this strength was 8.1 kg/mm².

After heating for 1,290 hours at 250°C, this strength was still 7.4 kg/mm² (measured at 25°C.).

EXAMPLE 5

The experiment described in Example 4 was repeated, but using 42.6 g. of N,N'-4,4'-diphenylmethane-bis-maleimide, and replacing the azophthalic anhydride by 12 g. of pyromellitic anhydride. The composition was obtained by heating the mixture at 150°C. for 12 minutes.

The curing of the composition was carried out at 265°C.under 250 kg/cm² for 30 minutes. The moulded article had a flexural breaking strength, at 250°C., of 3 kg/mm²; at 25°C. this strength was 7.5 kg/mm².

I claim:

1. A thermosetting composition which comprises the reaction product of a 1,2-epoxy resin, a polycarboxylic acid anhydride and a N,N'-bis-imide of the formula

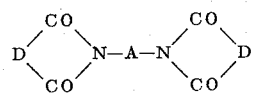

in which D represents a divalent radical containing a carbon-carbon double bond, and A represents a divalent radical containing at least two carbon atoms, said radical optionally containing substituents which do not give rise to a side reaction with the reactive groups present in the composition.

2. A composition according to claim 1, wherein the ratio of the number of anhydride groups to the number of epoxy groups is from 0.4:1 to 1.5:1.

3. A composition according to claim 2, wherein the ratio of the number of anhydride groups to the number of epoxy groups is from 0.8:1 to 1.1:1.

4. A composition according to claim 1, wherein the bis-imide is present in an amount from 40 to 250 percent based on the weight of epoxy resin.

5. A composition according to claim 4, wherein the bis-imide is present in an amount from 120 to 200 percent based on the weight of epoxy resin.

6. A composition according to claim 1, wherein the epoxy resin is a glycidyl ether of a polyol or phenol, the reaction product of epichlorohydrin and a primary or secondary amine or an aliphatic or alicyclic polyepoxide obtained by reacting a per-acid with an unsaturated aliphatic or alicyclic compound.

7. A composition according to claim 1, wherein the epoxy resin contains at least three epoxy groups per molecule.

8. A composition according to claim 1, wherein the epoxy resin is a glycidyl ether of a poly(hydroxyphenyl)alkane or a phenol/formaldehyde resin.

9. A composition according to claim 1, wherein the carboxylic acid anhydride is phthalic, maleic, tetrahydrophthalic, hexahydrophthalic, endomethylenetetrahydrophthalic, itaconic, citraconic or dodecylsuccinic anhydride.

10. A composition according to claim 1, wherein the carboxylic acid anhydride is trimellitic, pyromellitic, azophthalic, benzophenonetetracarboxylic, cyclopentatetracarboxylic, 3,4,4'-benzophenonetricarboxylic or benzoylpyromellitic anhydride.

11. A composition according to claim 1, wherein A represents a divalent radical comprising several benzene or alicyclic radicals which are joined directly, or indirectly by an oxygen or sulphur atom, an alkylene group having from one to three carbon atoms, or a —NR$_2$—, —P(O)R$_1$—,

—N=N—
↓
O

—CONH—, —SO$_2$—,

, 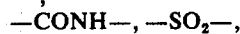

—CO—O—, —N=N—,

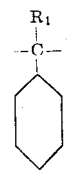

—S—S—, —SiR$_1$R$_2$—, —NY—CO—X—CO—NY—,
—O—CO—X—CO—O—,

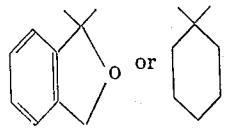 or 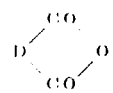

group in which R$_1$, R$_2$ and Y represent alkyl radicals having from one to four carbon atoms or cycloalkyl radicals having five or six carbon atoms in the ring, or benzene or polycyclic aromatic radicals, and X represents a linear or branched alkylene radical having less than 13 carbon atoms, a cycloalkylene radical having five or six carbon atoms in the ring, or a monocyclic or polycyclic arylene radical.

12. A composition according to claim 1, wherein D is derived from an ethylenic anhydride of formula

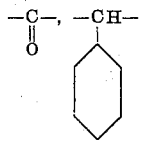

which is maleic, citraconic, tetrahydrophthalic or itaconic anhydride or a Diels-Alder cyclodiene adduct thereof.

13. A composition according to claim 1, which also contains an epoxy resin curing accelerator.

14. A cured resin obtained by curing a composition as claimed in claim 1 at a temperature from 150° to 300°C.

* * * * *